M. L. JOHNSON.
FRONT RUNNING GEAR FOR VEHICLES.
APPLICATION FILED DEC. 27, 1912.

1,135,939.

Patented Apr. 13, 1915.

WITNESSES
E. M. Callaghan
Amos W. Hart

INVENTOR
MADISON L. JOHNSON,
BY Munn & Co.
ATTORNEYS

UNITED STATES PATENT OFFICE.

MADISON LESLIE JOHNSON, OF GALENA, ILLINOIS.

FRONT RUNNING-GEAR FOR VEHICLES.

1,135,939.  Specification of Letters Patent.  Patented Apr. 13, 1915.

Application filed December 27, 1912. Serial No. 738,871.

*To all whom it may concern:*

Be it known that I, MADISON LESLIE JOHNSON, a citizen of the United States, and a resident of Galena, in the county of Jo Daviess and State of Illinois, have invented an Improvement in Front Running-Gear for Vehicles, of which the following is a specification.

My invention is an improvement in the forward axle-support of four-wheeled vehicles, particularly such as are self-propelled, the objects being to provide a construction and combination of parts which eliminates, so far as practicable, side thrust, and twist or torsion in passing over uneven surfaces, and to locate the point of pivotal connection between the front axle and the chassis as low as practicable.

In carrying out my invention, I embody it in two principal forms, both of which are hereinafter described and illustrated in the accompanying drawings, in which—

Figure 1:
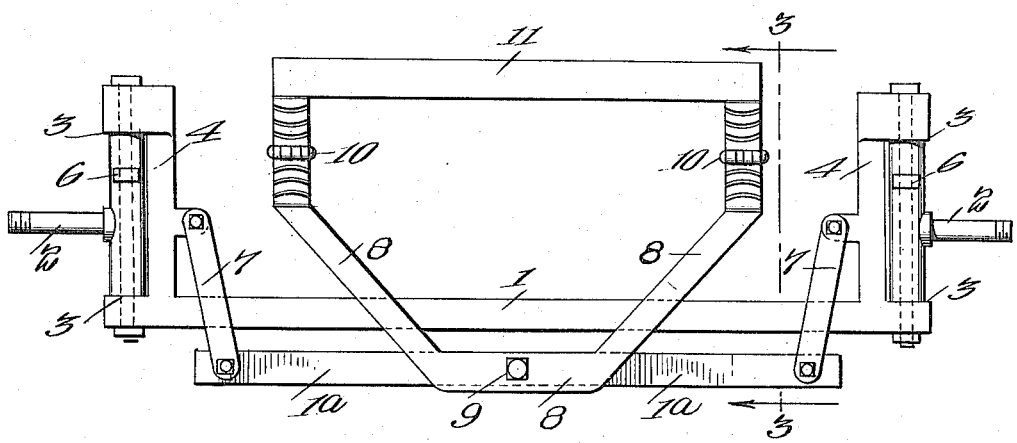
Figure 2:
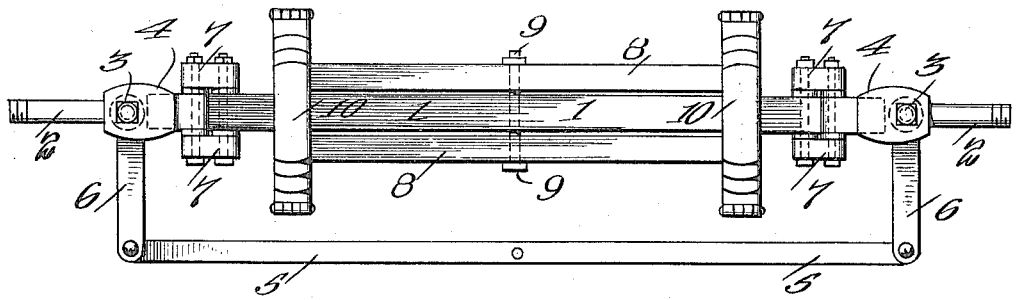
Figure 3:
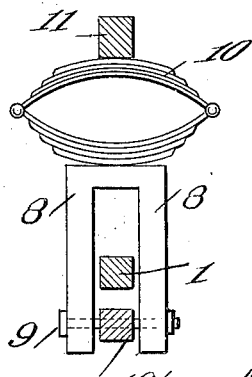

Figure 1 is a front elevation of one of said forms. Fig. 2 is a plan view. Fig. 3 is a vertical cross section on the line 3—3 of Fig. 1.

The main axle 1 is provided with journals 2 which are pivoted at 3 in yokes 4 projecting upward from the axle as usual in the well known type of automobiles.

As shown in Fig. 2, a so-called "jockey rod" 5 is pivotally connected with arms 6 that project forward from the pivots of the journals 2, the same being employed for steering in a well known manner.

A second or sub-axle 1ª is arranged underneath the main axle 1 and connected at its ends by means of parallel bars 7 with lugs projecting from the axle yokes 4. A twin head block or bolster 8 having approximately the form of an inverted truncated V is pivotally connected with the sub-axle 1ª by means of a king bolt 9 passing through the same—see Fig. 2.

Elliptical springs 10 are mounted on the connected upper ends of the duplicate portions of the head-block 8, and upon the said springs the front portion of the chassis 11 is in turn supported and secured. It will be seen in this arrangement that the twin head-block 8 straddles the main and sub-axles 1 and 1ª, and that the king-bolt 9 not only connects the parts but furnishes a rocking fulcrum for the head block which is located as low as practicable under the main axle. Thus, if the front wheel on the right side of the vehicle passes over an obstruction, it will not be subjected to greater load than it normally supports when the four wheels are on a level, by reason of the balanced pivot suspension of the chassis on the front axle, and further, the chassis does not tilt with the axle but remains level at all times save such inclination lengthwise as may be due to ascending or descending grades. The twin head block allows the axle to adjust itself to any ordinary inclination, and also the shocks caused by engagement of the wheel with any obstruction in the roadway are reduced to a minimum in effect.

What I claim is:—

1. The combination with a frame, a main axle and a sub-axle whose ends are jointed together, of a head block interposed between the frame and sub-axle and pivoted on the latter, and springs arranged between the head block and frame, as described.

2. The combination with a frame and a main and sub-axles, one arranged over the other and both flexibly connected, of a head block interposed between the sub-axle and frame and pivoted to the center of the former, and springs interposed between the upper ends of the head block and the frame, the latter being secured on the springs, as described.

MADISON LESLIE JOHNSON.

Witnesses:
B. C. SAMPSON,
H. L. HEER.

Copies of this patent may be obtained for five cents each, by addressing the "Commissioner of Patents, Washington, D. C."